Patented Sept. 25, 1951

2,568,742

UNITED STATES PATENT OFFICE 2,568,742

CHEMICAL DEMULSIFYING COMPOSITION AND DEMULSIFICATION METHOD

Willard H. Kirkpatrick, Sugar Land, Tex., assignor to Visco Products Company, Houston, Tex., a corporation of Delaware No Drawing. Application December 14, 1948, Serial No. 65,292

17 Claims. (Cl. 252—331)

This invention relates to the art of resolving petroleum emulsions, more particularly petroleum emulsions of the oil-in-water type, encountered, for example, in the production, handling and refining of petroleum. These oil-in-water emulsions, or so-called reversed emulsions, occur frequently in the Flower's Bluff, Freer, and Seven Sisters pools of Southwestern Texas and are occasionally encountered in other oil producing areas.

Oil field emulsions, for the most part, are of the water-in-oil type. The oil-in-water or reversed emulsions, to which the present invention is particularly directed, are frequently encountered, however, in the areas noted above. A reversed emulsion, as encountered in the oil fields, contains a small amount of oil, usually less than 1%, as the disperse phase, and its presence is denoted by the milky tinge which it imparts to the water, usually low in salt content. In the aforementioned areas, both types of emulsions are produced together, that is, the water which is the disperse phase in the normal water-in-oil emulsion is, in itself, an oil-in-water emulsion. Ordinary demulsifiers which resolve water-in-oil emulsions, have little or no effect on oil-in-water type emulsions. These latter emulsions have heretofore proven difficult to resolve and the recovery of the oil contained therein, which often means the difference between a successful and unsuccessful operation, has presented many problems.

One of the objects of the present invention is to provide new and useful chemical compositions. Another object of this invention is to provide a new and improved process for separating petroleum emulsions into their component parts, i. e., oil and water.

A further object of the invention is to provide a process for the resolution of emulsions encountered outside oil fields, as, for example, water in the hold of a ship contaminated with oil; in such cases clarification of the water prior to disposal in a harbor or bay area may be effected by the method herein described. Likewise, the process of the present invention may be employed in various other cases where separation of emulsions into their component parts is desired.

Further objects will appear from the following descriptions in which the reagents and the processes for their employment relate to the treatment of petroleum emulsions.

It has been discovered that petroleum emulsions, and particularly the reversed oil-in-water emulsions, may be readily and quickly resolved into their component parts by the use of the compositions disclosed herein. Further, the investigation shows that after treatment the water discharged from the gun barrel and settling tanks has excellent clarity, and the recovered oil is homogeneous, e. g., free from flocculent materials obtained when inorganic electrolytes such as calcium chloride and/or zinc chloride with or without protective colloids are used. In some instances, it has been found to be preferable to treat a mixture containing both types of emulsions by a single fluid containing a composition of the present invention and an additional substance adapted to resolve the normal water-in-oil emulsions, where the chemicals for the different emulsions are compatible.

According to this invention it has been found that new and improved results are obtained in resolving reversed emulsions by treating such emulsions with compositions comprising essentially a solution in a mutual solvent of a hydrophilic unionized colloid and a molecularly dehydrated condensation product of the reaction of zinc chloride and an alkylolamine, preferably a tertiary alkylolamine.

For the purpose of this invention the molecularly dehydrated zinc chloride condensation product is preferably at least partially neutralized with an acid, and the partially neutralized product may be admixed with one or more hydrophilic unionized colloids in the presence of the mutual solvent.

The compositions of the invention are improved in their stability and effectiveness by the addition of a gel liquefying agent or gel inhibiting agent for the hydrophilic unionized colloid, preferably urea.

The preferred alkylolamine employed as a starting material is triethanolamine which is a viscous and a very hygroscopic liquid that boils at 244 degrees C. at 50 mm. pressure. The commercial product which is preferably used for the purposes of the invention contains not more than 2.5% monoethanolamine, not more than 15% diethanolamine and not less than 80% triethanolamine. The neutral equivalent of the commercial product which is entirely satisfactory for the purpose of the invention will average about 140.

Other examples of primary, secondary, and tertiary alkylolamines suitable for the purpose of the invention are as follows: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2 - amino - 2 - methyl - 1 - propanol, octadecyldiethanolamine and polyethanolamine. Alkylolamines with ether linkages in the alkyl group are intended as functional equivalents.

The modification of triethanolamine results in a partially viscous liquid which retains its characteristic solubility in water and alcohol and the solubility in hydrocarbons is increased over the parent material. The modified products are more alkaline than the original triethanolamine and possess unusual properties which are not normally associated with the unmodified triethanolamine. Other alkylolamines, preferably tertiary alkylolamines having three or more hydroxyl groups in the molecule, are suitable for the purposes of this invention. Since triethanolamine is readily available commercially in ample quantities it is more desirable to use this alkylolamine.

Examples of suitable hydrophilic unionized colloids are starches, dextrins, British gums, gum arabic, gelatin, glue, casein, gum tragacanth, gum karaya, agar-agar, tannin, urea-formaldehyde water dispersible resins, and water soluble alkyl celluloses, e. g., methyl cellulose.

The gel liquefying ingredient apparently has no demulsifying effect per se on reversed emulsions, but permits a higher concentration of the active ingredient before the composition tends to gel when subjected to low temperatures. The higher concentration of the active ingredient also has a very pronounced effect on the results obtained in breaking petroleum emulsions. Instead of urea, other water soluble homologues or analogues thereof may be employed, e. g., methyl urea. Urea derivatives, including salts, and related compounds, such as dicyandiamide, as well as other compounds having a gel liquefying action on the hydrophilic unionized colloid, may also be used to partly or wholly replace the urea, it being understood, however, that urea is the preferred gel liquefying agent for the purpose of the invention.

It will be understood that it is not desired to be limited by the above listing, for other obvious equivalents to those skilled in the art may be employed to produce materials of the kind contemplated within the scope of this invention.

A resolving agent of the type herein described may be applied to the material to be demulsified in any of the suitable ways well known to those skilled in the art. Specifically, it may be injected in a single small stream, either continuous or intermittent, at short intervals into the flow line of the oil well by means of a force feed pump. Or it may be added manually to the fluid in a gun barrel, using agitation with gas to secure thorough mixing. As prepared by the procedures herein outlined it is occasionally somewhat too concentrated, or viscous, or both, for convenient handling in commercial proportioning pumps but it may readily be diluted with any suitable diluent employed as an intermediate vehicle. It is possible to secure effective resolving action by the addition of very small amounts of a resolving agent within a range from about 0.05% as low as 0.0004% of the main mass to which the resolving agent is added.

In order to illustrate specifically the materials employed in the new process described herein for use in accordance with the present invention, the following examples are set forth below as being typical of products suitable for use in this process. It is to be understood, however, that the invention is not confined to the specific chemicals or proportions thereof set forth in these examples as it will be obvious that equivalents of these chemicals and other proportions may be used without departing from the spirit of this invention and the scope of the appended claims. Unless otherwise indicated, the quantities are stated in parts by weight.

Example I

To 600 parts of triethanolamine there was added 30 parts of zinc chloride. The temperature was raised and 96 parts of aqueous-like distillate was secured. The greater portion of this distillate came over in the temperature range of 212 degrees C. to 225 degrees C. in about 9 hours. To 200 parts of the modified alkylolamine was added 310 parts of water and 100 parts of muriatic acid to yield the partially neutralized modified alkylolamine.

To 500 parts of the material prepared as above described, there was added 100 parts of a glue solution and 100 parts of a urea solution. The glue solution was prepared by dissolving 40 parts of powdered bone glue in 200 parts of water at 90 degrees C. The urea solution was prepared by dissolving 60 parts of urea in 60 parts of water. The aforementioned mixture was stirred at room temperature (75 degrees F.) to yield a demulsification composition which was characterized by excellent stability and which produces very good results in breaking reversed emulsions. Tests with this type of demulsifier indicated that the addition of the urea results in a composition with an improved demulsifying effect as compared with compositions not containing the urea, apparently due, in part, at least, to the fact that this composition will tolerate increasing concentrations of the active ingredients without gel formation at low temperatures.

Example II

A composition was prepared by heating together 600 parts of triethanolamine and 45 parts of zinc chloride until a total of 96 parts of aqueous distillate had been secured. This required 5½ hours. The initial water came off at 210 degrees C. and the final temperature was 227 degrees C. To 200 parts of this product there was added 310 parts of water and when this had cooled, there was finally added 102 parts of commercial hydrochloric acid to yield the final product. It will be observed that this product was made with about 7.5% zinc chloride based on the weight of the triethanolamine.

To 500 parts of the material prepared as above described, there was added 100 parts of a glue solution and 100 parts of a urea solution. The glue solution was prepared by dissolving 40 parts of powdered bone glue in 200 parts of water at 90 degrees C. The urea solution was prepared by dissolving 60 parts of urea in 60 parts of water. The aforementioned mixture was stirred at room temperature (75 degrees F.) to yield a demulsification composition which was characterized by excellent stability and which produces very good results in breaking reversed emulsions.

Other compositions were prepared in a similar manner using condensation products containing varying percentages of zinc chloride, namely, 1½%, 3½%, 5% and 7½%. The optimum results in breaking reversed emulsions were obtained with the products containing 7½% zinc chloride, and around 3% zinc chloride appeared to be the minimum zinc chloride content of the products at which practical effectiveness could be obtained.

Where the concentration of zinc chloride is higher than 10% a composition is obtained containing a noncompatible or insoluble solid portion amounting in some cases to as much as 33% to 50% by weight of the reaction mass. The insoluble portion can be reduced by partial neutralization but cannot be entirely eliminated and for this reason, it is preferable not to employ in excess of 10% zinc chloride in preparing these condensation products.

Partial neutralization improves the emulsion resolution efficiency. Maximum efficiency is noted at about 10% mineral acid (e. g. hydrochloric acid) with 5% mineral acid showing somewhat decreased efficiency. The unneutralized materials have demulsifying characteristics and will resolve oil-in-water emulsions but are less effective. These general conclusions are based on observations covering tests made on many emulsions. If the observations were limited to a single oil-in-water emulsion, it will be understood that there might be some deviations in the conclusions.

In the foregoing examples ordinary tap water served as a mutual solvent between the modified alkylolamine and the hydrophilic colloid. Other suitable solvents are isopropyl alcohol, ethylene glycol and homologous water-miscible alcohol ethers.

Various examples of the many products which answer the descriptions herein made are contemplated. Some of the products may be oil soluable, others water soluble. In many instances they may possess dual solubility to an appreciable extent. Even apparent insolubility is of no consequence, as the products are all soluble at least to the extent necessary for segregation at the emulsion interface as a water wettable colloid. The suitability of many of these products to the breaking and resolving of any given emulsion can readily be determined by the conventional procedures now in general use in oil fields and in laboratories which make such determinations.

The total quantity of solvent will depend upon the amount required in a flowable, pumpable liquid of the proper viscosity for use in a commercial proportioning pump. In general, the relative proportion of the zinc chloride-alkylolamine condensation product in the composition will be about 25% to 50% by weight and the solvent and hydrophilic unionized colloid, with or without the gel liquefying agent, will form the remainder of the composition. Where an acid has been added to the condensation product, the acid is considered a part of the condensation product and the quantity of acid has been included in the percentages given for the condensation product.

Although compositions containing any substantial amount (even 1% by weight of the composition) of the hydrophilic unionized colloid show an improvement over compositions containing no such colloid, the hydrophilic unionized colloids are preferably employed in a range of 5% to 10% by weight of the composition. The weight ratio of hydrophilic colloids to molecularly dehydrated zinc chloride-alkylolamine condensation product is preferably in the range of 1:3 to 1:9.

The weight ratio of urea or other gel liquefying agent to the hydrophilic unionized colloid is generally in the range of 0.5:1 to 4:1.

The use of the invention and the advantage thereof in breaking a particular emulsion will be governed by the nature of the oil-in-water emulsion which it is desired to break. The present invention is especially advantageous in breaking emulsions found in the Southwest Texas area where the oil is principally naphthenic or naphthenic-asphaltic.

The invention is hereby claimed as follows:

1. A process for the resolution of oil-in-water emulsions which comprises subjecting an oil-in-water emulsion to the action of a composition comprising essentially a molecularly dehydrated condensation product of the reaction of 3% to 10% by weight of zinc chloride with an alkylolamine, intimately dispersed with a hydrophilic unionized colloid in a mutual solvent for said colloid and said condensation product.

2. A process for the resolution of oil-in-water emulsions which comprises subjecting an oil-in-water emulsion to the action of a composition comprising essentially a molecularly dehydrated condensation product of the reaction of 3% to 10% by weight of zinc chloride and triethanolamine, intimately dispersed with a hydrophilic unionized colloid in a mutual solvent for said colloid and said condensation product.

3. A process for the resolution of oil-in-water emulsions which comprises subjecting an oil-in-water emulsion to the action of a composition comprising essentially a molecularly dehydrated condensation product of the reaction of 3% to 10% by weight of zinc chloride and an alkylolamine, intimately dispersed with a hydrophilic unionized colloid and a gel liquefying agent for said colloid in a mutual solvent for said colloid, said gel liquefying agent and said condensation product.

4. A process for the resolution of oil-in-water emulsions which comprises subjecting an oil-in-water emulsion to the action of a composition comprising essentially a molecularly dehydrated condensation product of the reaction of 3% to 10% by weight of zinc chloride and triethanolamine, intimately dispersed with a water soluble urea, and a hydrophilic unionized colloid in a mutual solvent for said colloid, said urea and said condensation product.

5. A process for the resolution of oil-in-water emulsions which comprises subjecting an oil-in-water emulsion to the action of a composition comprising essentially a molecularly dehydrated condensation product of the reaction of 7% to 10% by weight of zinc chloride and an alkylolamine, intimately dispersed with a hydrophilic unionized colloid in a mutual solvent for said colloid and said condensation product.

6. A process for the resolution of oil-in-water emulsions which comprises subjecting an oil-in-water emulsion to the action of a composition comprising essentially a molecularly dehydrated condensation product of the reaction of 7% to 10% by weight of zinc chloride and triethanolamine, intimately dispersed with a hydrophilic unionized colloid and a water soluble urea, in a mutual solvent for said colloid and said condensation product.

7. A process for the resoultion of oil-in-water emulsions which comprises subjecting an oil-in-water emulsion to the action of a composition comprising essentially a partially neutralized molecularly dehydrated condensation product of the reaction of 3% to 10% by weight of zinc chloride and an alkylolamine, intimately dispersed with at least 1% by weight of the composition of a hydrophilic unionized colloid dissolved in a mutual solvent for said colloid and said condensation product.

8. A process for the resolution of oil-in-water emulsions which comprises subjecting an oil-in-water emulsion to the action of a composition comprising essentially a partially neutralized molecularly dehydrated condensation product of the reaction of 3% to 10% by weight of zinc chloride and triethanolamine, intimately dispersed with a hydrophilic unionized colloid and urea in a mutual solvent for said colloid, urea, and said condensation product, the relative proportions of the partially neutralized zinc chloride-alkylolamine condensation product in said composition being 25% to 50% by weight, the hydrophilic unionized colloid forming 1% to 10% by weight of the composition, and the weight ratio of urea to said unionized colloid being in the range of 0.5:1 to 4:1.

9. A process for the resolution of oil-in-water emulsions which comprises subjecting an oil-in-water emulsion of the type found in Southwestern Texas to the action of a composition comprising essentially 25% to 50% by weight of a molecularly dehydrated condensation product of the reaction of 3% to 10% by weight of zinc chloride and triethanolamine, acidified with 5% to 10% by weight of hydrochloric acid, intimately dispersed and dissolved with urea and an animal glue in a mutual solvent, the weight ratio of said gule to said condensation product being in the range of 1:3 to 1:9, and the weight ratio of urea to glue being in the range of 0.5:1 to 4:1.

10. A composition comprising essentially a molecularly dehydrated condensation product of the reaction of 3% to 10% by weight of zinc chloride and an alkylolamine, intimately dispersed with a hydrophilic unionized colloid in a mutual solvent.

11. A composition comprising essentially a molecularly dehydrated condensation product of the reaction of 3% to 10% by weight of zinc chloride and an alkylolamine, at least partially neutralized with an acid, and intimately dispersed in a mutual solvent with a hydrophilic colloid.

12. A composition comprising essentially a molecularly dehydrated condensation product of the reaction of 7% to 10% by weight of zinc chloride and an alkylolamine, dispersed with a hydrophilic unionized colloid in a mutual solvent.

13. A composition comprising essentially a molecularly dehydrated condensation product of the reaction of 3% to 10% by weight of zinc chloride and triethanolamine, dispersed with a hydrophilic unionized colloid in a mutual solvent.

14. A composition comprising essentially a molecularly dehydrated condensation product of the reaction of 7% to 10% by weight of zinc chloride and an alkylolamine, a hydrophilic unionized colloid and a gel liquefying agent for said colloid dispersed in a mutual solvent.

15. A composition comprising essentially a molecularly dehydrated condensation product of the reaction of 3% to 10% by weight of zinc chloride and triethanolamine, a water soluble urea, and a hydrophilic unionized colloid dispersed in a mutual solvent.

16. A composition comprising essentially a molecularly dehydrated condensation product of the reaction of 7% to 10% by weight of zinc chloride and a tertiary alkylolamine, at least partially neutralized with an acid, intimately dispersed with animal glue, urea, and a mutual solvent.

17. A composition comprising essentially a partially neutralized molecularly dehydrated condensation product of the reaction of 7% to 10% by weight of zinc chloride and triethanolamine, urea, animal glue, and a mutual solvent.

WILLARD H. KIRKPATRICK.

REFERENCES CITED

The following references are of record in the file of this patent:

UNITED STATES PATENTS

| Number | Name | Date |
| --- | --- | --- |
| 1,950,483 | Christopher et al. | Mar. 13, 1934 |
| 2,159,313 | Blair et al. | May 23, 1939 |
| 2,407,895 | Monson | Sept. 17, 1946 |
| 2,427,326 | Goodloe | Sept. 9, 1947 |
| 2,492,473 | Fuchs | Dec. 27, 1949 |

OTHER REFERENCES

Page 478 of the article by Felice Garelli and Angelo Tetamanzi dealing with the reaction of triethylolamine and metallic salts, Gazetta Chimica Italiana, vol. 64 (1934).